United States Patent [19]
Higuchi et al.

[11] Patent Number: 5,311,030
[45] Date of Patent: May 10, 1994

[54] TAPE END DETECTING DEVICE FOR TAPE DECKS USING CENTER AND SIDE PRISMS FOR DIRECTING LIGHT

[75] Inventors: Yoshio Higuchi; Osamu Maeda; Hideo Makino; Masami Okada; Hiroshi Kobayashi; Hiroshi Inoue; Seiji Mori, all of Daito, Japan

[73] Assignee: Funai Electric Co., Ltd., Daito, Japan

[21] Appl. No.: 939,933

[22] Filed: Sep. 2, 1992

[30] Foreign Application Priority Data

| Sep. 3, 1991 | [JP] | Japan | 3-079492[U] |
| Dec. 11, 1991 | [JP] | Japan | 3-351586 |
| Apr. 10, 1992 | [JP] | Japan | 4-118391 |
| Jun. 26, 1992 | [JP] | Japan | 4-193148 |

[51] Int. Cl.⁵ .................. G11B 23/02; G11B 15/48
[52] U.S. Cl. .................. 250/561; 360/132; 360/74.6
[58] Field of Search ........... 250/560, 561, 571, 227.11; 356/375; 360/74.6, 132

[56] References Cited

U.S. PATENT DOCUMENTS

| 4,057,839 | 11/1977 | Banks | 360/93 |
| 4,380,032 | 4/1983 | Pfost | 360/132 |
| 4,644,433 | 2/1987 | Horikawa et al. | 360/132 |
| 4,763,217 | 8/1988 | Oishi | 360/132 |
| 4,791,715 | 12/1988 | Lovelace | 250/561 |
| 4,848,698 | 7/1989 | Newell et al. | 250/571 |
| 4,862,305 | 8/1989 | Katagiri et al. | 360/132 |
| 4,886,220 | 12/1989 | Oishi | 360/132 |
| 5,121,275 | 6/1992 | Komiyama | 360/132 |

*Primary Examiner*—David C. Nelms
*Assistant Examiner*—S. B. Allen
*Attorney, Agent, or Firm*—Lackenbach Siegel Marzullo Aronson and Greenspan

[57] ABSTRACT

A tape end detecting device for detecting the end of the tape enclosed within a cassette includes a light emitting element for generating a light pulse signal, a pair of light receiving element, a light guide means comprising a central prism and a pair of side prisms disposed at both sides of said cassette loaded in position, and a tape end signal generating circuit adopted for generating a tape end detecting signal only when it receives the light pulse signal. Therefore, the tape end detecting device operates to generate an output upon receipt of the light signal, but does not generate when the light coming from outside is received.

5 Claims, 8 Drawing Sheets

TAPE END DETECTING DEVICE FOR TAPE DECKS USING CENTER AND SIDE PRISMS FOR DIRECTING LIGHT

BACKGROUND OF THE INVENTION

The present invention relates to a device for detecting the end of the tape to be adopted to a video or audio cassette tape recorders, generally so called as "tape deck", for playing and/or recording analog or digital signal.

In a conventional cassette tape for use in video or audio cassette tape recorders, the magnetic tape enclosed in a cassette housing has transparent portions at both ends thereof, which are used to detecting the end of the tape by means of a tape end detecting device comprising a pair of light emitting and receiving elements. The light emitting element of the tape end detecting device is usually supported by a holder planted on a circuit board in such manner to be positioned at the same height of the running tape, while the light receiving elements are fitted to a chassis of the tape deck.

In such arrangement, it has been experienced that the holder projecting from the surface of the circuit board tends to be damaged upon building up of the circuit board. In addition, each of the light receiving elements must be connected to a tape end signal generating circuit formed on the circuit board through wirings, thereby resulting in a complex construction and assembling operation.

Furthermore, a conventional tape end detecting device has a disadvantage that it may generate a detecting signal even when the housing of the tape deck is opened for various services including repair, because the receiving element would be energized by the light from outside.

OBJECTS OF THE INVENTION

An object of the present invention is to provide a tape end detecting device which can operate to detect the end of the magnetic tape with a high responsibility.

Another object of the present invention is to provide a tape end detecting device with a simple construction which enables reduction of manufacturing costs due to simplification of the assembling of the circuit board and wiring.

SUMMARY OF THE INVENTION

According to the present invention, there is provided a tape end detecting device for detecting the end of the tape enclosed within a cassette comprising:

a light emitting means for generating a light pulse signal;

a pair of side prisms disposed at both sides of said cassette loaded in position;

a central prism for directing the light beam from said light emitting means to said first and second side prisms;

a pair of light receiving means for receiving said light signal from said light emitting means through said side prisms, respectively; and a tape end signal generating circuit adopted for generating a tape end detecting signal including said light receiving means, which comprises a high pass filter and a comparator for comparing the output voltage of said light receiving element with a reference voltage.

Thus, according to the present invention, the tape end signal generating circuit operates only when a light pulse signal having a predetermined frequency is received, so that the tape end detecting device does not operate by the light coming from outside.

In a preferred embodiment of the present invention, the central prism has an inlet surface disposed above the light emitting element and a first and second reflecting surfaces disposed within the cassette, the first reflecting surface being formed to direct the light beam from the light emitting element to the inlet surface of the first side prism, and the second reflecting surface being formed to direct the light beam from the light emitting element to the inlet surface of the second side prism.

The first and second reflecting surfaces may be formed in an X- or V-shaped cut out portion formed on top of the central prism.

Another features and advantages of the present invention will be clearly understood from the following description with reference to the accompanying drawings.

DETAILED DESCRIPTION

Figure 1:
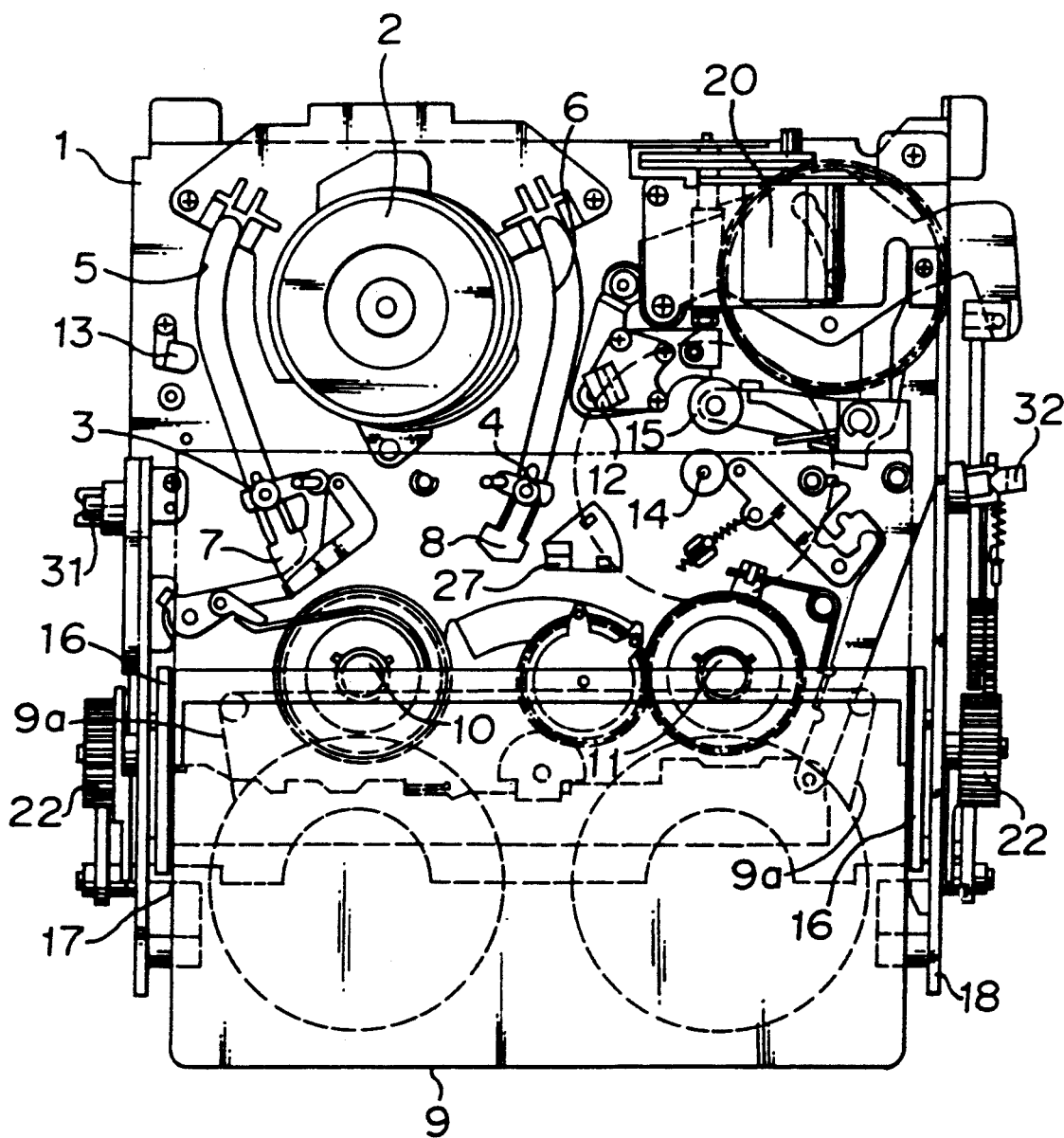
FIG. 1 is a plan view of an essential portion of the VHS video tape deck equipped with a tape end detecting device embodying the present invention.
Figure 2:
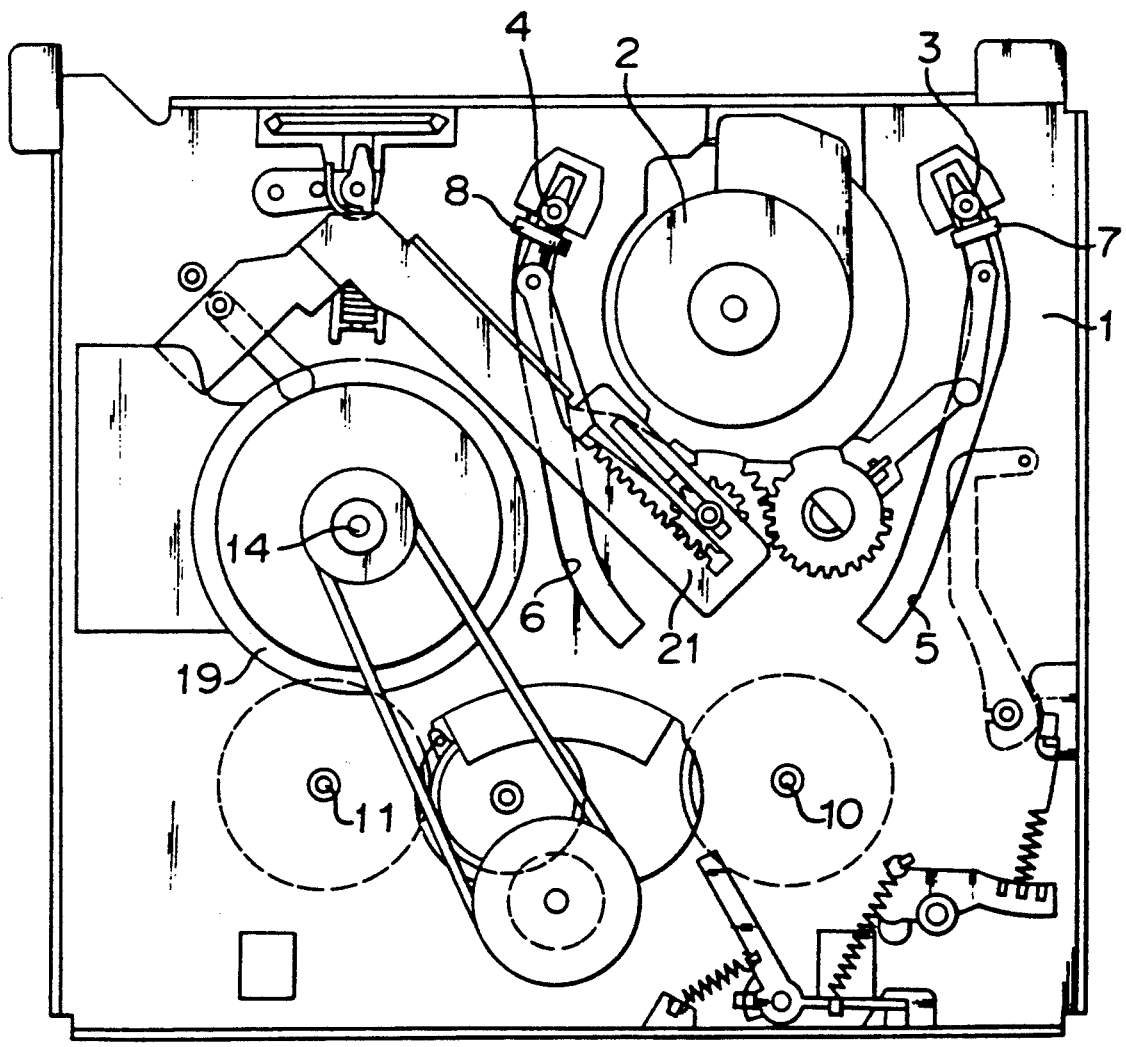
FIG. 2 is a plan view of the driving mechanism of the tape deck shown in FIG. 1.
Figure 3:
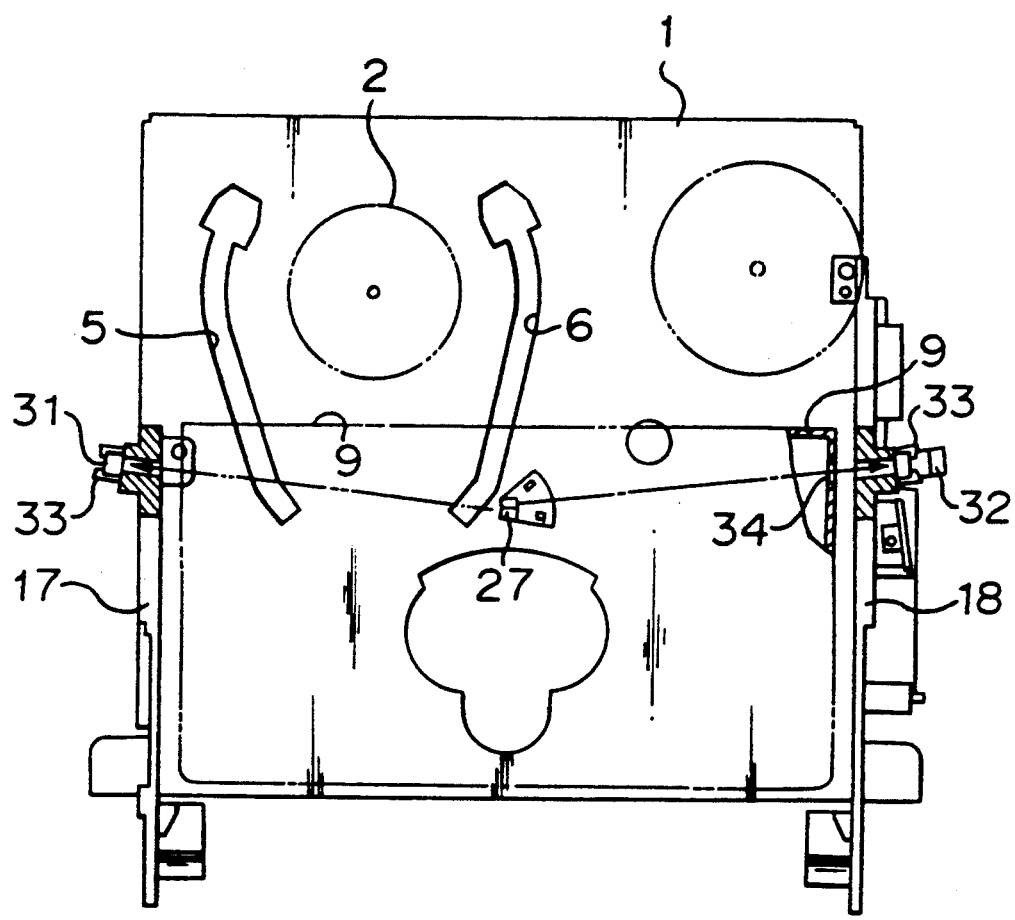
FIG. 3 shows a geometrical arrangement of the prisms of the tape end detecting device embodying the present invention.

Referring to the drawings, particularly to FIGS. 1 through 5, there is illustrated an essential portion of the tape deck embodying the present invention adopted for a VHS video tape deck. The tape deck includes a chassis 1 of the deck having a substantially rectangular shape viewed in plan, and a rotatable head cylinder 2 bearing recording and playback heads. Tape loading pins 3 and 4 are supported by the slidable members 7 and 8, respectively. The members 7 and 8 are movable along the rails 5 and 6, respectively, for guiding a magnetic tape 9a enclosed in a cassette 9 between the predetermined loaded position and unloaded position. A pair of tape reels of the cassette are engaged with supply and wind up shafts 10 and 11, respectively. Numeral 13 depicts an erase head, 14 a capstan, and 15 a pinch roller.

A cassette holder 16 is provided for receiving the cassette 9 inserted through a port (not shown), and carrying the cassette to a predeteremined loaded position for playing or recording, and vise versa. The movement of the cassette holder is guided by guide plates 17, 18. After the cassette has been set at the loaded position, a loading mechanism including a loading motor 20, a tape loading lever 21 brings the magnetic tape into a prescribed path where the tape is ready for running. The loading motor 20 acts also to drive the cassette holder 16 to move it. The specific construction and its movement of the loading mechanism is well known to those skilled in the art.

A recording/playing circuit and a motor controlling circuit are formed on a circuit board 23 secured to the chassis 1 by means of screws 24.

Figure 4:
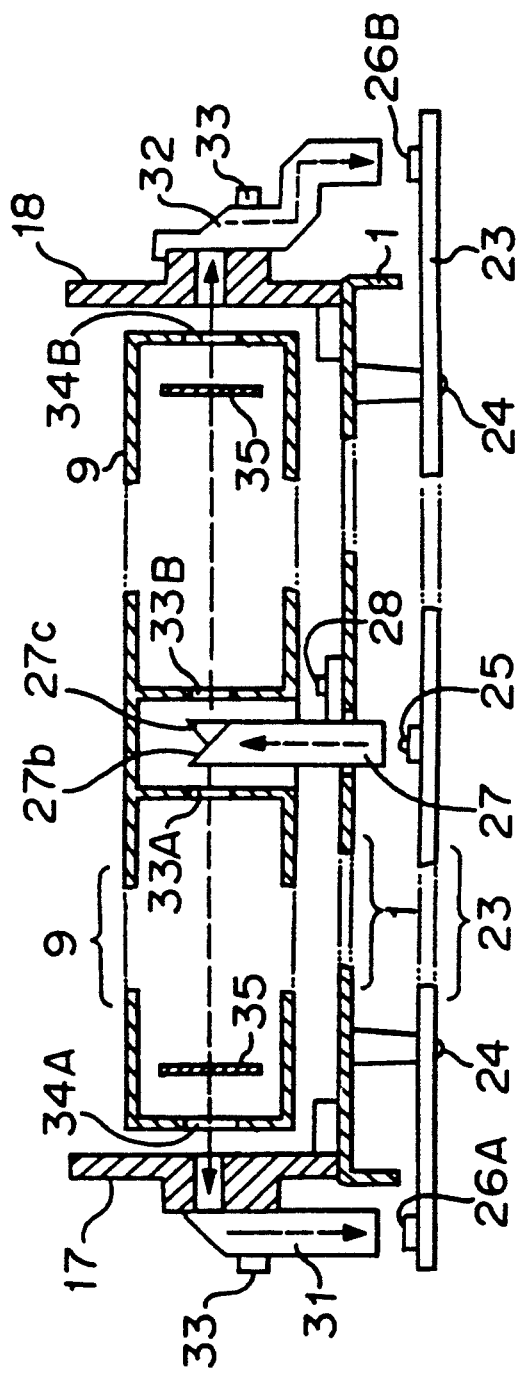
FIGS. 4 and 5 show the relation between the cassette and the prisms.
Figure 5:
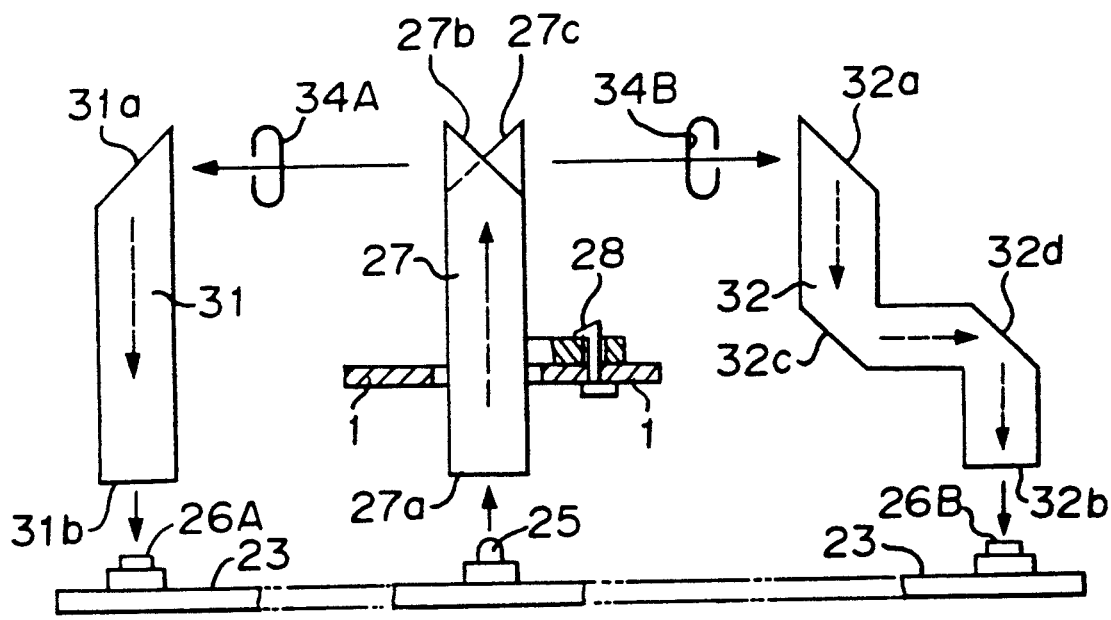

As best shown in FIGS. 4 and 5, a light emitting element such as an light emitting diode (LED) 25 and a pair of light-receiving elements such as phototransistors 26A and 26B of a tape end generating circuit, which will be described below, are disposed on the circuit board 23.

A tape end detecting device according to the present invention also comprises a central prism 27 and a pair of side prisms 31 and 32. The central prism 27 is of an elongated rod having an inlet surface 27a and two reflecting surfaces 27b and 27c, and securely fitted to the circuit board 1 by means of a hook 28 secured to the prism 27 at a position that the inlet surface faces to the light emitting diode 25. The side prisms 31 and 32 are securely supported by the guide plate 17 and 18 by any suitable means, such as hooks 33, respectively.

The first reflecting surfaces 27b of the central prism 27 is placed to intersects the axis of the prism 27 at an angle of about 45 degrees in one direction, so as to direct the light beams from the LED 25 to the inlet end of the first side prism 31 through ports 33A, 34A formed in the side walls of the cassette. While, the second reflecting surface 27c intersects at the same angle, but in the opposite direction to that of the surface 27a to direct the light beams to the inlet end of the second side prism 32 through port 33B, 34B.

In this embodiment, the first side prism 31 is in the form of a rod having a substantially rectangular cross section, with a reflecting surface 31a at one end and an outlet end 31b at the other end. The reflecting end 31a is disposed in a plane with an angle of about 45 degrees to the axis of the prism so as to direct the light beams coming from the central prism to the outlet end 31b. The second side prism 32, on the other hand, is of crank-like configuration having inlet surface 32a and outlet surface 32b at both ends, respectively, and two reflecting surfaces 32c and 32d disposed between the inlet and outlet surfaces, thereby to direct the light beams from the second outlet surface 27c through the ports 33B, 34B to the second phototransistor 26B.

Referring again to FIG. 4, which illustrates the tape deck in its operating condition with the tape cassette 9 being loaded in position, the light beam emitted from the light emitting diode (LED) 25 enters into the body of the central prism 27 through the inlet surface 27a and divided into two beams at the reflecting surfaces 27b and 27c. The light beam reflected at the first reflecting surface 27b enters into the cassette 9 through the port 33A and then reaches to the tape 35. When this portion of the tape is opaque, the light beam is interrupted. However, if a portion of the transparent tape, which is connected at both ends of the magnetic tape, is placed, then the light beam passes through the tape and reaches to the inlet surface 31a of the first side prism 31. The first phototransistor 26A detects the light beam coming form the first side prism 31 and produces a tape end detecting signal.

Similarly, the light beam reflected at the second reflecting surface 27c enters into the cassette 9 through the port 33B and then reaches to the tape 35. If a portion of the transparent tape is placed, then the light beam passes through the tape and reaches to the inlet surface 32a of the second side prism 32 and then to the second phototransistor 26B which produces a tape end detecting signal.

Figure 6:
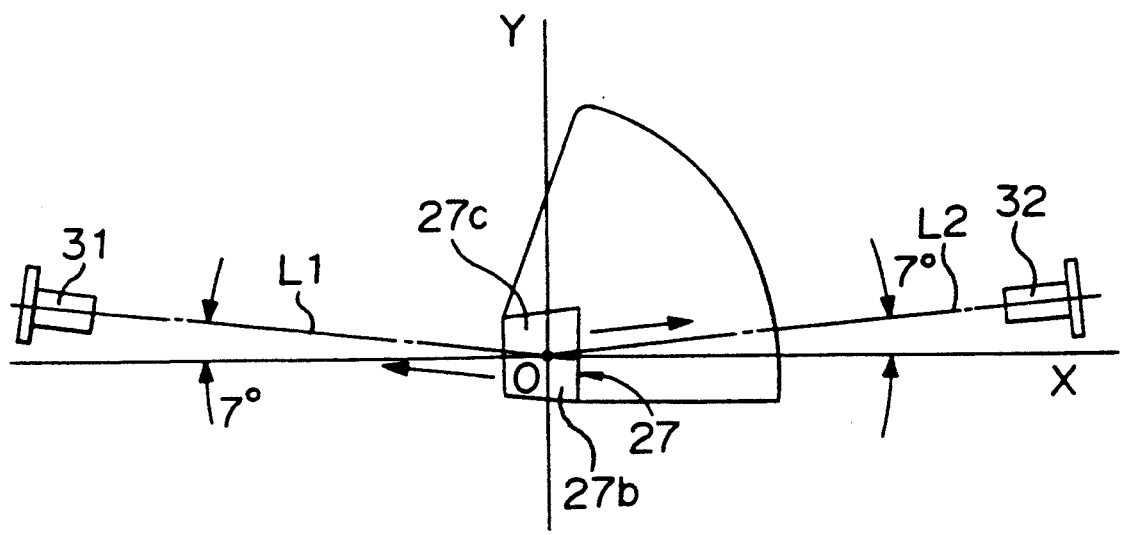
FIG. 6 shows the relation between the central and side prisms of the device embodying the present invention.
Figure 7:
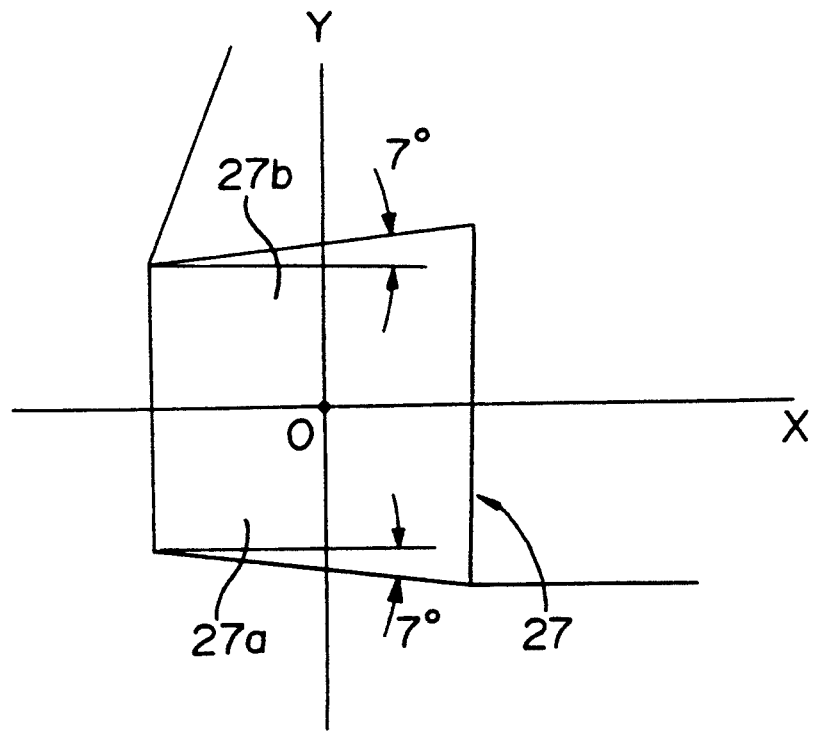
FIG. 7 is a top plan view of the central prism.

FIG. 6 illustrates a geometrical arrangement of the central and side prisms of the tape deck embodying the present invention designed under the JIS standards, wherein the lines L1 and L2 connecting between the center of the central prism 27 and the centers of the first and second side prisms 31 and 32, respectively, are inclined by 7 degrees with respect to the line X which intersects the center line of the central prism and lies in parallel with the line connecting the axes of the reels of the cassette. Preferably, in order to direct the reflected light beams from the central prism to both the side prisms, the side walls, opposing to each other, of the central prism are disposed on the planes parallel to the lines L1 and L2, respectively. Namely, the cross section of the central prism forms a trapezoid of which both side lines are inclined at 7 degrees to the base line, as clearly shown in FIG. 7.

Figure 8:
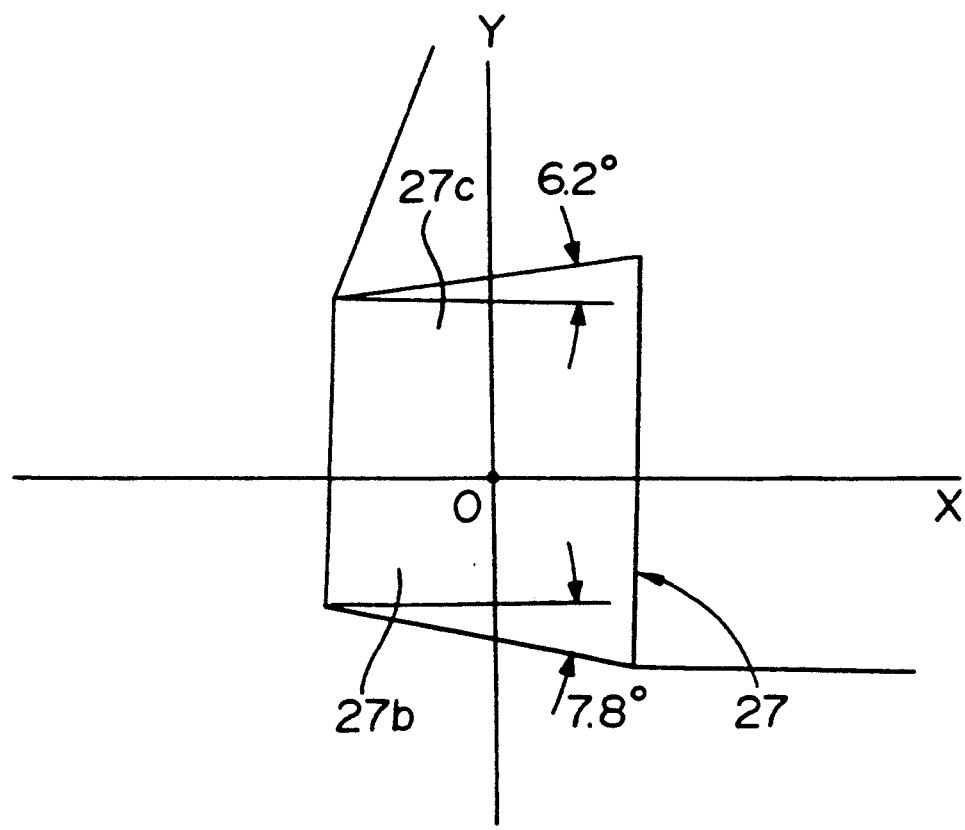
FIG. 8 shows a preferred angular arrangement of the central prism.

For the most efficient transmission of the light beams form the central prism to the side prisms, it is preferable that the central prism 27 is fixed in such manner that the side line position above the line X is inclined by about 6.2 degrees to the line X, and the other side line by about 7.8 degrees, as illustrated in FIG. 8. This arrangement ensures that the light beams reflected at the reflecting surfaces 27b and 27c can be directed to the center of the receiving surface of each of the side prisms.

Figure 9:
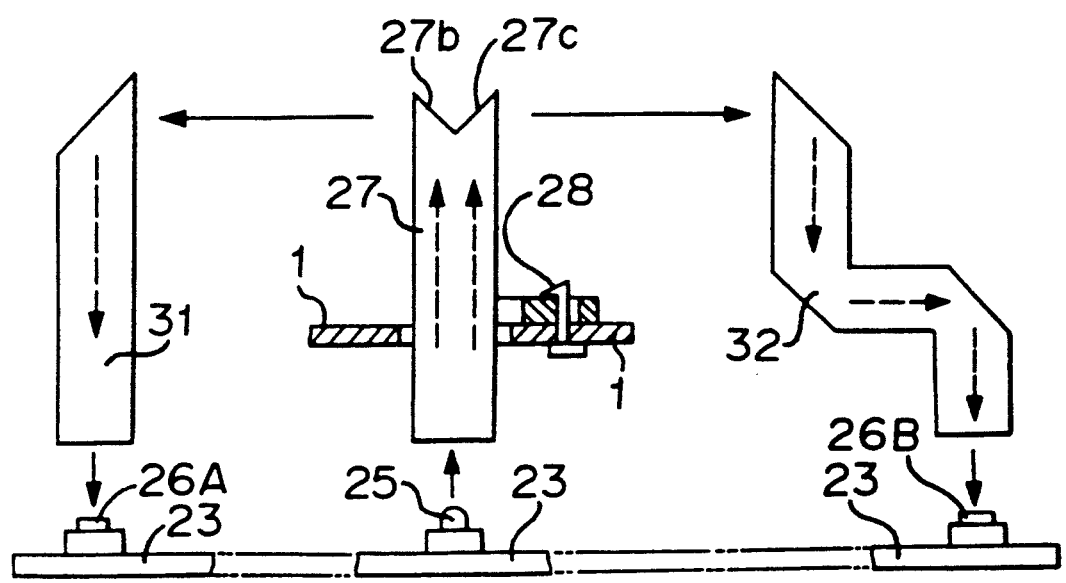
FIG. 9 shows the relation between the central and side prisms of another device embodying the present invention.

FIG. 9 illustrates another type of the central prism 27 useful for the tape deck of the present invention. In this embodiment, the central prism 27 has a V-shaped end for forming reflecting surfaces 27b and 27c. In this arrangement, the reflecting surfaces 27b and 27c are placed to face the inlet surfaces of the side prisms, respectively, thereby to eliminate delicate angle adjustment of the central prism as required in the arrangement shown in FIG. 5.

Figure 10:
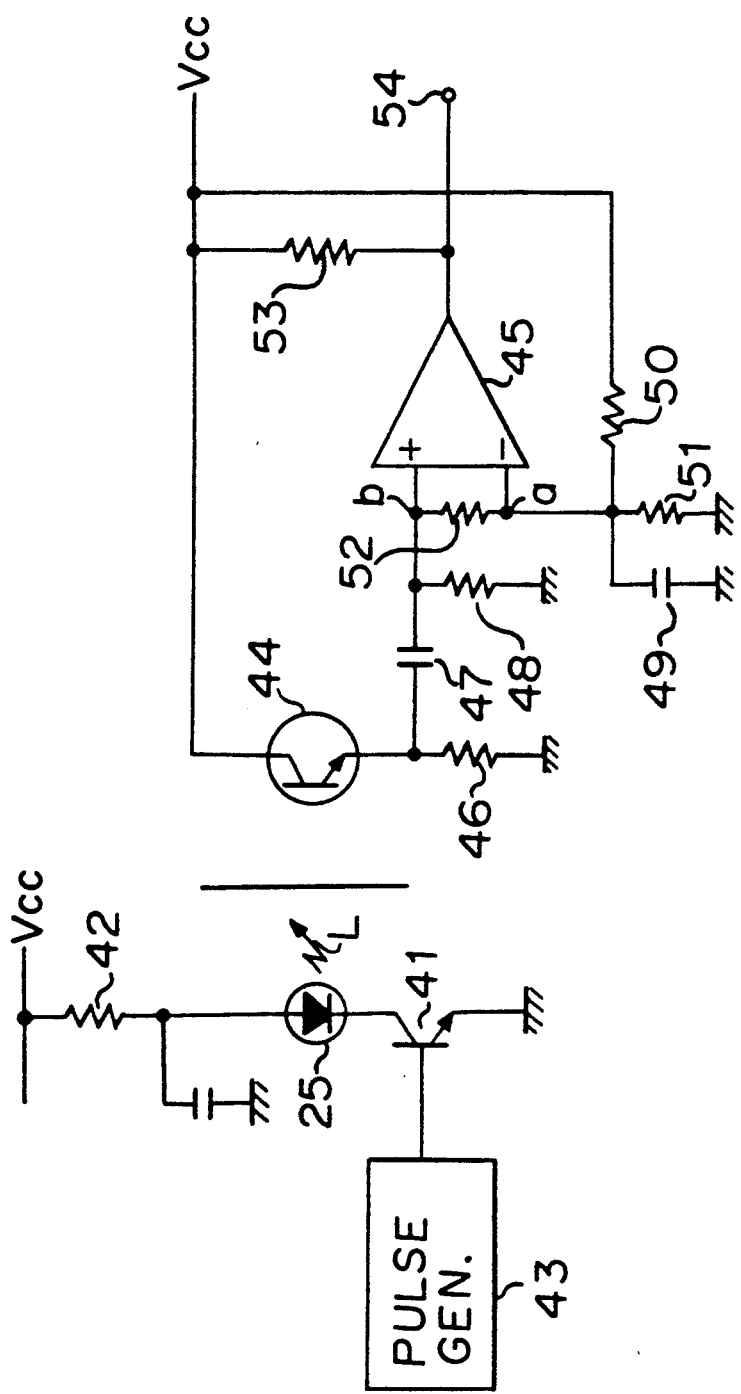
FIG. 10 is a circuit diagram of the tape end signal generating circuit of the device embodying the present invention.

FIG. 10 illustrates a circuit diagram of a tape end signal generating circuit for the tape end detecting device embodying the present invention, which includes a light emitting circuit having the LED 25 and a light sensing circuit having a light receiving element or phototransistor 44 which corresponds to the phototransistor 26A or 26B as shown in FIG. 4.

The light emitting circuit further comprises a transistor 41 of which collector is connected to a DC line through a resister 42 and the LED 25. The base of the transistor is connected to a pulse generator 43 which generates a pulse train having a desired frequency to energize the transistor 41 in a reciprocal ON and OFF operation, resulting in generation of a light pulse signal from the LED 25.

The phototransistor 44 of the light sensing circuit is positioned to receive the light pulse signal from the LED 25 through the tape 35. A collector of the phototransistor 41 is connected to the DC power supply line, while an emitter is connected to a ground via a load 46 and to an input of a comparator 45 through a high pass filter comprising a capacitor 47 and a resister 48. To the other input of the comparator 42 is connected a reference voltage generating circuit which comprises a capacitor 49 and dividing resisters 50, 51 to generate a reference voltage at a point (a). The reference voltage is also impressed to the other input via a resister 52. Namely, reference voltage generating circuit sets a hysteresis-added type threshold level. The output of the comparator 45 is connected to the DC line through a resister 53 and to an output terminal 54.

When the transparent portion of the tape of the cassette has reached at the position to allow the light beam from the central prism 27 to be directed to one of the side prisms 31 and 32, the light beam, which is shown in FIG. 10 by the numeral L, enters to the phototransistor 26A or 26B. The light beam L, which is a light pulse signal from the LED 25, is directed to the base of the phototransistor 44 to energize it, thereby to generate a pulse signal at the emitter. This pulse signal passes through the high pass filter, where a direct current and low frequency components in the signal are cut off, and then to the input of the comparator 45. The time constant of the high pass filter should be selected in accordance with the frequency of the pulse signal. The comparator 45 functions to compare the voltage level of the input signal with the reference voltage at the point (a).

When the level of the input pulse signal at a point (b) is higher than the reference voltage or a threshold level at the point (a), the output of the comparator 45 is kept to be a high level, so that a pulse signal is obtained at the terminal 54. This signal may be used as a tape end detecting signal in a control circuit formed on the circuit board 23.

As has been stated above, the light signal used in the tape end detecting device of the present invention is a light pulse signal having a proper frequency, so that the current value at each peak of the pulse can be two times as compared with the case that the LED 25 is energized by a DC current. Therefore, even when the phototransistor 44 is brought into ON by the noise caused by a light coming from outside, the wrong signal is cut off, when the parameters such as the threshold level corresponding to the difference in voltage between the points (a) and (b), or the time constant of the high pass filter are properly selected. Moreover, if a wrong signal could reach to the input of the comparator 45, it will be suppressed by the set voltage between the points (a) and (b). Thus, the tape end signal generating circuit can generate a tape end detecting signal only when the light pulse signal from the LED 25 is supplied to the phototransistor 44.

What is claimed is:

1. A tape end detecting device for detecting the end of the tape enclosed within a cassette comprising:
    a light emitting means for generating a light pulse signal;
    a pair of side prisms disposed at both sides of said cassette loaded in position;
    a central prism for directing the light beam from said light emitting means to said first and second side prisms;
    a pair of light receiving means for receiving said light signal from said light emitting means through said side prisms, respectively; and
    a tape end signal generating circuit adopted for generating a tape end detecting signal including said light receiving means, which comprises a high pass filter and a comparator for comparing the output voltage of said light receiving element with a reference voltage.

2. The tape end detecting device according to claim 1, wherein said central prism has an inlet surface disposed above said light emitting element and a first and second reflecting surfaces disposed within said cassette, said first reflecting surface being formed to direct the light beam from said light emitting element to the inlet surface of said first side prism, and said second reflecting surface being formed to direct the light beam from said light emitting element to the inlet surface of said second side prism.

3. The tape end detecting device according to claim 1, wherein said first and second reflecting surfaces are formed in the surfaces of the V-shaped portion formed on the top of said central prism.

4. The tape end detecting device according to claim 1, wherein said light emitting means comprises a light emitting diode, a transistor for controlling said light emitting diode, and a pulse generating circuit for energizing said transistor at a desired frequency.

5. The tape end detecting device according to claim 1, wherein said light receiving means comprises a comparator which generates an output when the input level is higher than the predetermined reference level.

* * * * *